United States Patent [19]

Yamada et al.

[11] 3,764,088

[45] Oct. 9, 1973

[54] AUTOMATIC TAPE LOADING TYPE MAGNETIC RECORDING AND REPRODUCING APPARATUS

[75] Inventors: Hisayoshi Yamada; Kyohei Nakada, both of Kanagawa-ku, Yokohama-city; Yukio Seta, Adachi-ku, Tokyo; Masakatsu Kai, Seya-ku, Yokohama-city, Kanagawa-ken, all of Japan

[73] Assignee: Victor Company of Japan, Ltd., Yokohama City, Japan

[22] Filed: May 6, 1971

[21] Appl. No.: 140,893

[30] Foreign Application Priority Data

| | | |
|---|---|---|
| May 18, 1970 | Japan | 45/41638 |
| June 12, 1970 | Japan | 45/50268 |
| May 9, 1970 | Japan | 45/44675 |
| May 18, 1970 | Japan | 45/47794 |
| May 18, 1970 | Japan | 45/47795 |
| May 19, 1970 | Japan | 45/48309 |

[52] U.S. Cl. .................... 242/195, 226/91, 242/188, 352/158

[51] Int. Cl. .......................... G03b 1/04, G11b 15/32

[58] Field of Search .................... 242/186, 188, 195, 242/57; 226/91, 92; 352/157, 158; 274/4 D, 11 D, 11 F

[56] References Cited

UNITED STATES PATENTS

| | | | |
|---|---|---|---|
| 3,127,120 | 3/1964 | Selsted et al. | 242/188 |
| 3,153,516 | 10/1964 | DeLoof et al. | 242/188 |
| 3,333,783 | 8/1967 | Guernet | 242/188 |
| 3,630,468 | 12/1971 | Christoffersen et al. | 242/195 |
| 3,656,703 | 4/1972 | Yockenhuber et al. | 242/197 |

*Primary Examiner*—Leonard D. Christian
*Attorney*—Louis Bernat

[57] ABSTRACT

An automatic tape loading type magnetic recording and reproducing apparatus comprises means for detecting a feeding of a predetermined length of tape leader from a supply reel and then for stopping the feeding, an automatic take-up reel for automatically engaging and winding the fed-out tape leader, and means for detecting when the tape leader has been engaged and wound by the automatic take-up reel and then for positively driving the tape. The automatic take-up reel has an engaging pawl which engages the tape leader outside of the reel flanges.

9 Claims, 22 Drawing Figures

INVENTORS
HISAYOSHI YAMADA
KYOHEI NAKADA
YUKIO SETA
MASAKATSU KAI
BY
Louis Bernat ATTORNEY INVENTORS
HISAYOSHI YAMADA
KYOHEI NAKADA
YUKIO SETA
MASAKATSU KAI
BY
Louis Bernat ATTORNEY INVENTORS
HISAYOSHI YAMADA
KYOHEI NAKADA
YUKIO SETA
MASAKATSU KAI
BY
Louis Bernat ATTORNEY INVENTORS
HISAYOSHI YAMADA
KYOHEI NAKADA
YUKIO SETA
MASAKATSU KAI
BY
Louis Bernat
ATTORNEY INVENTORS
HISAYOSHI YAMADA
KYOHEI NAKADA
YUKIO SETA
MASAKATSU KAI
BY
Louis Bernat ATTORNEY INVENTORS
HISAYOSHI YAMADA
KYOHEI NAKADA
YUKIO SETA
MASAKATSU KAI
BY
Louis Bernat
ATTORNEY

AUTOMATIC TAPE LOADING TYPE MAGNETIC RECORDING AND REPRODUCING APPARATUS

This invention relates to an automatic tape loading type magnetic recording and reproducing apparatus and, more particularly, to apparatus for automatically guiding the tape-like member as it is fed from a supply reel along a predetermined path and is automatically engaged by a take-up reel.

There has generally been proposed an automatic tape loading type magnetic recording and reroducing apparatus in which a tape is fed from a supply reel within a cartridge along a predetermined path and automatically wound on an automatic take-up reel. This type of magnetic recording and reproducing apparatus comprises means for feeding a tape-like member, such as a tape or a tape leader attached at an end of the tape, out of a supply reel. Then, a guide means directs the fed-out tape-like member along a predetermined path. An automatic take-up reel automatically engages and winds the tape-like member thus guided.

This conventional automatic tape loading type magnetic recording and reproducing apparatus has a construction in which the feeding of the tape from the supply reel is stopped when a single detecting means detects a contact between the tape and the take-up reel. Thereafter, the tape is transported by means of a capstan and a pinch roller. In this conventional apparatus, the feeding of the tape from the supply reel is continued even if the take-up reel fails, for one reason or another, to wind the tape or tape leader fed out of the supply reel and guided to the take-up reel, As a result, the over-fed tape stays both inside and outside of the predetermined tape running path resulting in damage of the tape.

In another conventional apparatus, a predetermined length of the tape-like member is fed out by the tape feeding means. Here the tape is positively driven and run by the capstan and the pinch roller. Consequently, in this apparatus, the tape-like member is liable to be damaged by continued running thereof in case the automatic take-up reel has failed to catch it in the same manner as described above.

Further, the automatic take-up reel used in this conventional automatic tape loading type recording and reproducing apparatus has a construction in which the tape-like member is caused to advance between the upper and lower flanges of the reel. The tape-like member is automatically caught by an engaging pawl which is projecting slightly from the reel hub into the space between the upper and lower flanges. The tape-like member is wound on the take-up reel hub. This automatic take-up reel has a disadvantage since, if the end of the tape-like member does not advance to the proper spot, the engaging pawl cannot engage and wind the tape-like member accurately.

With a view to ensuring the engagement of the engaging pawl with the tape-like member, there have been proposed devices such that the tape-like member is blown toward the engaging pawl by means of an air stream. A rotatable guiding means is employed in the apparatus. These devices, however, have a disadvantage since they make the construction of the apparatus very complicated. There has also been proposed an automatic take-up reel in which projecting parts are provided on the upper and lower flanges thereof for holding a tape-like member therebetween to facilitate engagement of the reel with the tape-like member. In this proposed automatic take-up reel, the tape-lke member is required to advance accurately in the direction of the projecting parts of the reel flanges. Also (the projecting parts tend to push the tape-like member outwardly and away from the flanges.

Sometimes, an engaging force of the engaging pawl is made stronger and an engaging angle is made larger. This ensures engagement of the pawl with the tape-like member, but the end portion of the tape-like member thus engaged by the engaging pawl will have a permanent bend. This permanent bend in the tape-like member prevents a smooth feeding of the tape-like member from the cartridge and causes the tape-like member to be blocked in its predetermined path in the apparatus during an auto-threading operation. If, on the other hand, the engaging force of the engaging pawl is made weak and the engaging angle is made small, an accurate engagement of the tape-like member cannot be ensured. Particularly, in one construction the engaging pawl moves in a pivotal motion about a shaft, in the same direction as the take-up reel winds the tape-like member. The tape-like member receives an excessive impact force which is composed of a winding force of the reel and a pivoting force of the engaging pawl. Impact occurs at the time when the engaging pawl engages the tape-like member, resulting in damage of the end portion of the tape-like member.

It is, therefore, a general object of the invention to eliminate the above described disadvantages of the conventional apparatus by providing a novel and useful automatic tape loading type magnetic recording and reproducing apparatus.

Another object of the invention is to provide an apparatus which does not feed a tape-like member exceeding a predetermined length. In case the automatic take-up reel fails to automatically engage and wind the tape-like member, there is no positive driving and running of the tape-like member. By this arrangement, even if the automatic take-up reel fails to automatically engage the tape-like member, damage of the tape-like member due to over-supply can be avoided.

A further object of the invention is to provide an automatic tape loading type magnetic recording and reproducing apparatus in which the tape-like member is fed out of the supply reel by a predetermined length and stopped at a predetermined position outside of the take-up reel. The end can be engaged at that predetermined position by the take-up reel. According to this construction, the automatic take-up reel can accurately engage the tape-like member.

A still further object of the invention is to provide an automatic tape loading type magnetic recording and reproducing apparatus having an automatic take-up reel which is capable of automatically engaging the tape-like member smoothly and surely, without damaging the end portion of the tape-like member or producing a permanent bend at the end of the tape-like member.

Other objects and features of the invention will become apparent from the description made hereinbelow with reference to the accompanying drawings, in which.

AUTO-THREADING AND AUTO-LOADING

Figure 1:
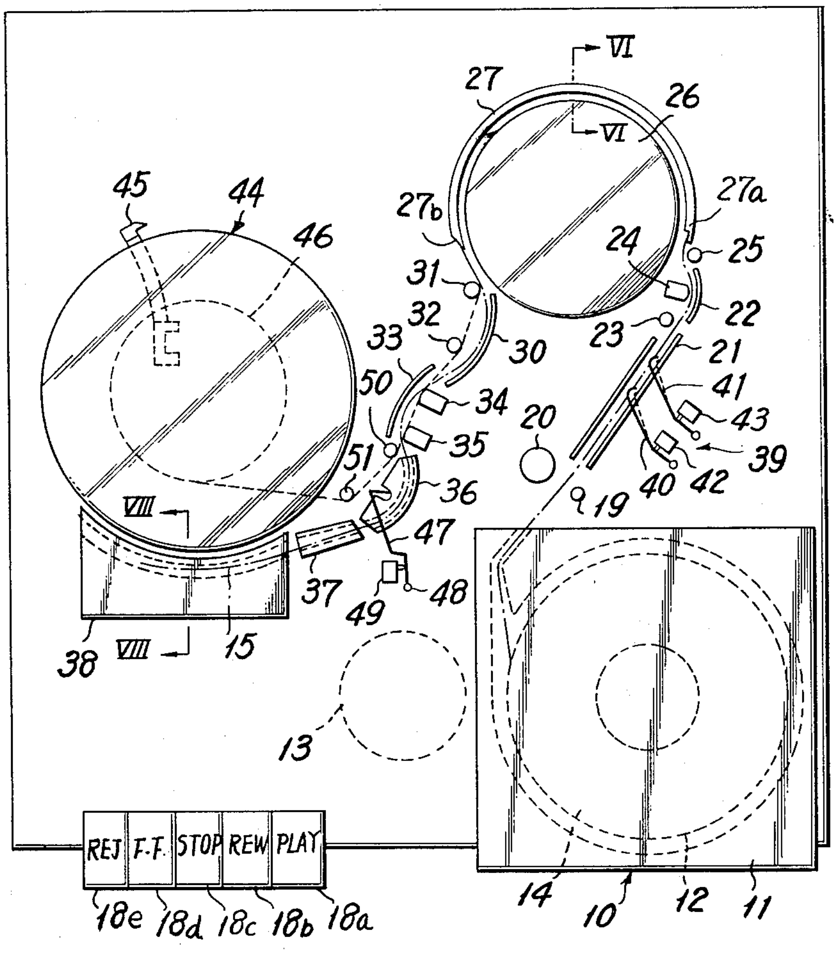
FIG. 1 is a schematic plan view of one embodiment of an automatic tape loading type magnetic recording and reproducing apparatus according to this invention.

First to be explained are the operations of one embodiment of an automatic tape loading type magnetic recording and reproducing apparatus, according to the invention. Its auto-threading and auto-loading modes will be illustrated with reference to FIG. 1.

A tape cartridge 10 is mounted in a predetermined position on an apparatus, as shown in the figure. The tape cartridge 10 generally consists of a cartridge casing 11 and a supply reel 12 housed in the cartridge casing 11. At the front surface of the cartridge casing, there is formed an outlet for the tape. At one side, there is formed an opening for receiving a tape feed roller 13. A magnetic tape 14, having a tape leader 15 attached to the foremost end of the magnetic tape 14, are wound on the supply reel 12.

Figures 2, 3, 4A, 4B, 4C, 4D, 4E, 4F, 4G, 4H:
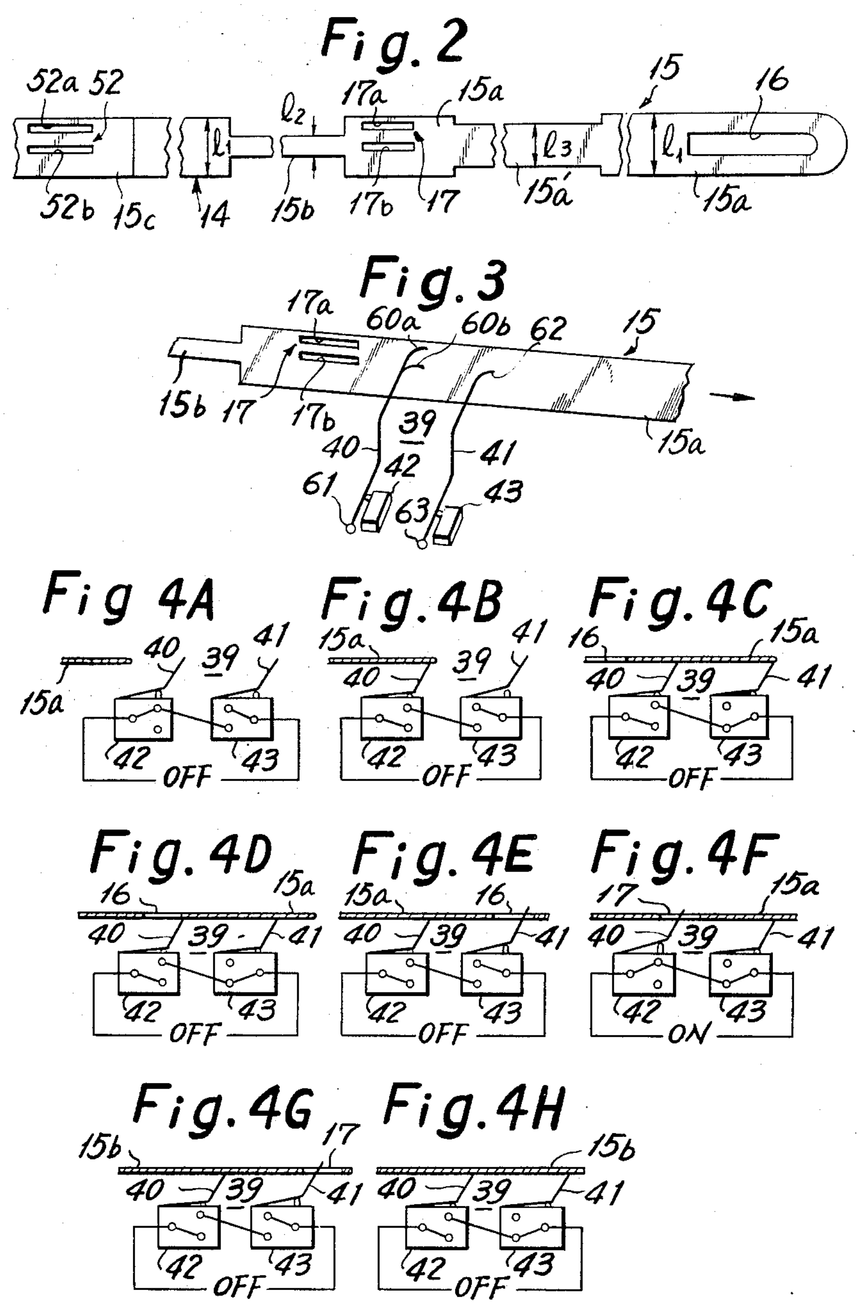
FIG. 2 is an elevational view of one embodiment of a tape leader.
FIG. 3 is a perspective view showing a relationship between a mechanical sensor and a tape leader.
FIG. 4A through FIG. 4H are respectively diagrams for illustrating switching operations of the mechanical sensor.

The tape leader 15 consists of a first tape leader portion **15*a* and a second leader portion 15*b*, as shown in FIG. 2. At the foremost end of the tape, the first leader portion 15*a* has a width $l_1$ which is the same as the width $l_1$ of the magnetic tape 14. The second tape leader portion 15*b* has a width $l_2$ which is less than the width $l_1$ and is provided between the first leader portion 15*a* and the magnetic tape 14. The first leader portion 15*a* is made of a relatively hard flexible material which is normally in a straight state. The second leader portion 15*b* is made of a soft flexible material which will not damage a tip of a magnetic head when it makes contact with the tip of the magnetic head. The first leader portion 15a is formed in its foremost end portion with an engaging slot 16. In its part which is close to the second leader portion 15*b*, the first leader portion 15*a* is also formed with a slot portion 17 which includes two slots 17*a* and 17*b*. Between the engaging slot 16 and the slot portion 17, the first leader portion 15*a* is further formed with a narrower first leader portion 15*a*', having a width $l_3$ which is slightly smaller than the width $l_1$. The widths $l_1$, $l_2$, $l_3$ are so selected that they satisfy a relationship $l_2<l_3<l_1$. The slot 17*a* is not longitudinally aligned with the second leader portion 15*b* and the engaging slot 16. However, the slot 17*b* is longitudinally aligned with both the second leader portion 15*b* and the engaging slot 16**.

In automatic loading of the tape, a play button **18*a* (FIG. 1) is depressed downwardly. This places the apparatus in an auto-loading mode, thus causing the tape feed roller 13 to enter th cartridge 10. The roller 13 rotates in a pressed contact with the outer periphery of a roll of the magnetic tape 14 and the tape leader 15 wound around the supply reel 12. The rotation of the roller 13 causes the roll to rotate with the reel 12, whereby the tape leader 15 (led by the first leader portion 15*a*) is fed out of the tape outlet of the cartridge 10**.

The tape leader 15, fed out of the tape cartridge 10 passes between a capstan 19 and a pinch roller 20 and is guided to a sensor guide 21. The tape leader 15 passes between a guide plate 22 and a guide pole 23 and an erasing magnetic head assembly 24, and then between a guide pole 25 and a guide drum 26 containing rotary magnetic heads (not shown) for recording and reproducing video signals. The leader enters a leader guide 27 from its entrance end **27*a***.

Figure 6:
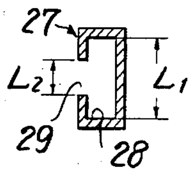
FIG. 6 is a vertical sectional view of a leader guide shown in FIG. 1 and taken along the line VI — VI thereof.

The leader guide 27 is positioned slantwise relative to the scanning surface of the guide drum 26 and is spaced slightly away therefrom. The guide 27 surrounds substantially the semicircle of the guide drum 26. The leader guide 27 has a nearly C-shaped cross-section, as shown in the vertical section of FIG. 6. A leader passage 28 has a width $L_1$ and an opening 29 having a width $L_2$ formed on the opposite side of the guide drum 26. The widths $L_1$ and $L_2$ of the leader guide 27 are so selected that they will satisfy the relation $l_2<L_2<l_3<l_1<L_1$. The first leader portion **15*a* of the tape leader 15 moves into the leader passage 28, from the entrance 27*a* of the leader guide 27. When the tape leader is engaged and wound by the take-up reel, the first leader portion 15*a* moves through the leader guide 27. The second leader portion 15*b* reaches the leader guide 27, and is disengaged from the guide through the opening 29, of the leader guide 27. Thus, the tape is brought into contact with the guide drum 26. Consequently, the magnetic tape 14, which follows the second leader portion 15*b*, directly contacts the guide drum 26 without entering the leader guide 27**.

The tape leader 15, which has emerged from the leader guide 27, is guided by a tape guide plate 30 and passes between the guide plate 30 and guide poles 31 and 32. The tape leader 15 further passes between a tape guide plate 33 and an erasing head assembly 34 and a control signal and audio signal head assembly 35 and is guided along guides 36 and 37, respectively. These guides have a C-shaped cross-section. The tape leader 15 is guided by the guide 37 into an automatic winding leader guide block 38, and it moves into its recess.

When a certain predetermined length of the tape leader 15 has been fed out of the tape cartridge 10 and the tip of the first tape leader portion **15*a* has reached a predetermined position in the guide block 38, a mechanical sensor 39 detects the fact that the predetermined length of the tape leader 15** has been fed out.

The mechanical sensor 39 comprises, as will be described later, sensor arms 40 and 41, and switches 42 and 43 cooperating therewith. When the first leader portion 15*a* has reached the predetermined position in the guide block 38, the slot portion 17 formed in first leader portion 15*a* is at a position at which the slot portion 17 can cooperate with the mechanical sensor 39. Thus, the above described detection is performed by cooperation of the sensor arms 40 and 41 which drop through the slots 17*a* and 17*b*.

The aforementioned detection by the mechanical sensor 39 causes the tape feed roller 13 to be retracted from the cartridge 10. Since the roll of the magnetic tape 14 and the tape leader 15 is no longer rotated, the tape leader 15 is no longer fed from the cartridge 10. The foremost end of the first leader portion 15a temporarily stops its movement at a predetermined position in the guide block 38, as shown in FIG. 1. By the foregoing operation, the auto-threading of the tape leader 15 into the predetermined leader passage has been completed. Simultaneously with the completion of the auto-threading, an automatic take-up reel 44 starts its rotation responsive to the aforementioned detection by the mechanical sensor 39.

The automatic take-up reel 44 has a leader engaging pawl 45 which may be projected from a reel hub 46 and thereafter retracted therein, as it will be described later. The leader engaging pawl 45 has its pawl end portion extended beyond the reel flanges in a state wherein it is not in engagement with the leader. As the automatic take-up reel 44 rotates clockwise, as viewed in FIG. 1, under this condition, the pawl end portion of the engaging pawl 45 which projects outside of the reel flanges moves into the guide block 38 and engages the engaging slot 16 of the first leader portion 15*a*, positioned in the guide block 38.

As the engaging pawl 45 engages the first leader portion 15*a*, and rotates with the reel 44, the first leader portion 15*a* is disengaged from the guide block 38 and wound around the reel hub 46 of the take-up reel 44. As the first leader portion 15*a* is wound on the reel 44, the leader 15 resumes its movement.

By resumption of the movement of the tape leader 15, the narrower leader portion 15*a'* of the first leader portion 15*a* moves into the guide 36. At this point, the leader portion 15*a'* is disengaged from the guide 36 and brought outside of the guide 36, as will be described later. When the leader portion 15*a'* is brought outside of the guide 36, an arm 47 which is povitally supported on an oil damper 48 is swung by the leader portion 15*a'*, thereby closing a switch 49.

Thereafter, the tape leader 15 and the magnetic tape 14 pass along guide poles 50 and 51 and are wound directly on the reel hub 46 of the reel 44. The foregoing operation completes the auto-loading of the tape leader 15 and the magnetic tape 14 into the predetermined path in the apparatus.

Upon the closing of the switch 49, the engagement and winding of the tape leader 15 by the automatic take-up reel 44 is detected. Then the apparatus is changed over from the auto-threading and auto-loading mode to a recording and reproducing mode. At this time, the pinch roller 20 is pressed against the capstan 19 and the magnetic tape 14, thereby driving the magnetic tape 14. When the magnetic tape 14 runs along the guide drum 26, recording and reproducing of video signals are effected by the rotary magnetic heads.

MECHANICAL SENSOR

The mechanical sensor 39 is illustrated with reference to the perspective view shown in FIG. 3. The sensor arm 40 has, at its foremost end, bent projections 60*a* and 60*b* which can engage the slots 17*a* and 17*b* of the first leader portion 15*a*. The sensor arm 40 receives a spring biased or weighted force about an axis 61, with the arm urged in a direction moving away from the normally closed microswitch 42. The sensor arm 41 has, at its foremost end, a bent projection 62 which can engage the slot 17*b*. The sensor arm 41 receives a similar force, about an axis 63, urging it in the direction moving away from the normally opened microswitch 43. The arm 40 and the switch 42 cooperating therewith are disposed at a position with respect to the moving direction of the leader, which is nearer to the cartridge 10 than the arm 41 and the switch 43 cooperating therewith. The microswitches 42 and 43 are connected in series to the electric circuit.

An operation of the mechanical sensor 39 having the foregoing construction will be described with reference to FIG. 4A through FIG. 4H. As shown in FIG. 4A, the arms 40 and 41 are spaced away from the switches 42 and 43, which is their position before the tip of the first leader portion 15*a* reaches the sensor 39. Since the switch 43 is normally opened, the sensor 39 is in an OFF state, and the circuit connected in series through the switches 42 and 43 is in an OFF state.

Then, as shown in FIG. 4B, the first leader portion 15*a* moves, and its foremost end reaches the position of the arm 40. The foremost end of the first leader portion 15*a* pushes against the projections 60*a* and 60*b* of the arm 40 thereby moving the arm 40. The normally closed switch 42 is pushed open by the arm 40. The switches 42 and 43 are both opened so that the sensor 39 is still in the OFF state.

The first leader portion 15*a* further moves, as shown in FIG. 4C, and its foremost end reaches the position of the arm 41. Then, the first leader portion 15*a* pushes the projection 62, at the tip of the arm 41, thereby moving the arm 41. The normally opened switch 43 is pushed by the arm 41 and is closed. However, the switch 42 is maintained open sinch it is being pushed by the arm 40, which is being pushed by the first leader portion 15*a*. Accordingly, the sensor 39 is still in the OFF state.

The first leader portion 15*a* further moves, as shown in FIG. 4D. The engaging slot 16 reaches the position of the arm 40. At this stage, however, the projection 60*a* of the arm 40 is in contact with an edge part of the first leader portion 15*a*, so that the switch 42 remains open. Accordingly, the sensor 39 remains in the OFF state.

As shown in FIG. 4E, the first leader portion 15*a* moves further and the engaging slot 16 reaches the position of the arm 41. At this stage, the projection 62 of the arm 41 falls into and engages the engaging slot 16. This moves the arm 41 of the switch 43 and opens the switch, whereas the switch 42 remains open. Consequently, the sensor 39 is still in the OFF state.

Then, the first leader portion 15*a* continues its movement, and the slot portion 17 reaches the arm 40 as shown in FIG. 4F. At this stage, the projections 60*a* and *ab* of the arm 40 respectively engage the slots 17*a* and *b*, thereby moving the arm 40 of the switch 42. As a result, the normally closed switch 42 returns to normal and the closed state. In the meanwhile, since the arm 41 is in contact with the first leader portion 15*a* and is pushed by it, the normally opened switch 43 is in a closed state. Consequently, since the switches 42 and 43 are in the closed states, and the sensor 39 changes to an ON state. It is to be noted that the position of the slot portion 17 is so selected that, when the foremost end of the first leader portion 15*a* has reached the predetermined position in the guide block 38, the slot portion 17 has reached the position of the arm 40. As the sensor 39 changes to the ON state, it indicates that the predetermined length of the leader 15 has been fed from the tape cartridge 10. Thus, as the sensor 39 changes to the ON state, the tape feed roller 13 is retracted from the tape cartridge 10 as described above, and the automatic take-up reel 44 starts its rotation.

By engagement of the automatic take-up reel 44, with the first leader portion 15*a*, the leader 15 resumes its movement. As shown in FIG. 4G, the slot portion 17 is brought out of engagement with the arm 40, and the arm 40 is pushed by the leader 15. When the second leader portion 15*b* has reached the position of the arm 40, the projection 60*b* is pushed by the second leader portion 15*b*. Consequently the switch 42 is opened by the arm 4o which is pushed in the aforementioned manner. The sensor 39 is thus brought into the OFF state. Once the sensor 39 changes to the ON state, the tape feed roller 13 is retained in its retracted position. The automatic take-up reel 44 continues its rotation after the sensor 39 returns to the OFF state.

The tape leader 15 continues its movement, as shown in FIG. 4H. The arms 40 and 41 are pushed by the second leader portion 15*b* or the magnetic tape 14 to close the switch 43. Since, however, the switch 42 remains open, the sensor 39 is in the OFF state.

If it is difficult to push the arms 40 and 41 in the direction of the thickness of the tape leader 15, thereby opening and closing the switches 42 and 43, the snesor guide 21 may be made substantially of a C-shaped cross-section, having an opening the width of which is narrower than that of the first leader portion 15*a*. When the leader has not yet moved into the guide, the arms 40 and 41 are placed inside of this sensor guide, through the opening thereof. When the tape leader moves into the sensor guide, the arms 40 and 41 perform the same operations as described above in cooperation with the tape leader. According to this arrangement, the swinging strokes of the arms 40 and 41 can be made greater at the time when they make contact with the leader.

TENSION SWITCH MECHANISM

A tension switch mechanism comprising the aforementioned guide 36, tension arm 47, switch 49 will now be described with reference to FIG. 5A, FIG. 5B and FIG. 7. The guide 36 is curved so as to guide the tape leader to the arcuate opening of the guide block 38 through the guide 37. The guide 36 has, as shown in a vertical section of FIG. 7, a leader passage 70 having a width $L_1$ and an opening 71 having a width $L_3$ on the opposite side of the automatic take-up reel 44, and it has a substantially C-shaped cross-section. The widths $l_1$, $l_2$ and $l_3$ of the tape leader 15, the widths $L_1$ and $L_2$ of the leader guide 27, and the widths $L_1$ and $L_3$ of the guide 36 are fixed to satisfy the relationship $l_2<L_2<l_3<L_3<l_1<L_1$. The guide 36 is formed substantially in the middle thereof with a recess 72 across the opening 71 on the opposite side of the reel 44.

Figure 5A:
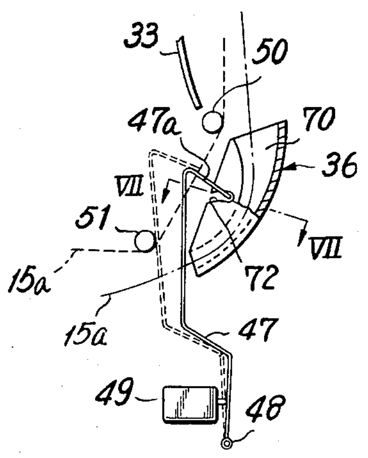
FIG. 5A and FIG. 5B are respectively plan views of a tension switch mechanism for illustrating the operations thereof.
Figure 5B:
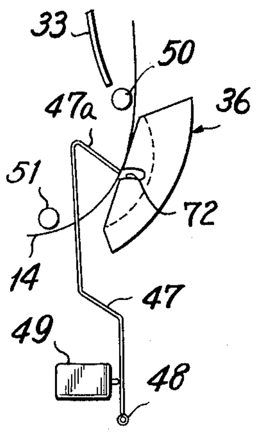

The arm 47 is receiving a force tending to move it in a clockwise pivotal motion about the oil damper 48, in FIG. 5A. The folded end portion 47*a* of the arm 47 is normally positioned inside of the recess 72 of the guide 36, as shown by full line in FIG. 5A and FIG. 7. It is engaged by one end of the recess 72. The microswitch 49 is opened and closed by the pivotal movements of the arm 47. While the arm 47 is engaaged in the recess 72, the microswitch 49 is opened.

The first leader portion 15*a*, which has moved into the guide block 38 is engaged with and wound by the pawl 45 of the reel 44 as previously described. The first leader portion 15*a* moves through the passage 70 of the guide 36, and the narrower leader portion 15*a'* of the first leader portion 15*a* reaches the guide 36. Since the width $l_3$ of the leader portion 15*a'* is narrower than the width $L_3$ of the opening 71 of the guide 36, the leader portion 15*a'* is brought out of engagement with the guide 36, through the opening 71. The leader portion 15*a'* is also disengaged from the guide 37 which has the same cross-section as the guide 36. Accordingly, the remainder of the first leader portion 15*a* (and the following second leader portion 15*b* and the magnetic tape 14) passes over the path shown by a broken line where it is guided by the guide poles 50 and 51.

Figure 7:
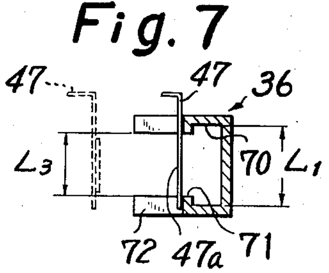
FIG. 7 is a vertical sectional view of a guide shown in FIG. 5A and taken along the line VII — VII thereof.

When the leader portion 15*a'* is disengaged from the guide 36 and moves out of it as described above, the arm 47 moves in a pivotal motion to the position shown by a broken line in FIG. 5A and FIG. 7 the folded end portion 47*a* is pushed by the leader portion 15*a'*. As the arm 47 makes the pivotal movement, the switch 49 is pushed by the arm 47 and is closed. It is to be noted that, unless the first leader portion 15*a* located in the guide block 38 is engaged and wound by the reel 44, the tape leader 15 does not move on. Accordingly, the leader portion 15*a'* does not reach the guide 36 and the leader is not disengaged from the guide 36. A closing of switch 49 indicates that the reel 44 has engaged the first leader portion 15*a*. The closing of the switch 49 causes the apparatus to change over from the auto-loading mode to the recording or reproducing mode as previously described. The pinch roller 20 is then pressed against the capstan 19. Thus, the magnetic tape 14 is positively driven by the capstan 19 and the pinch roller 20 to run along its path of travel.

If the running magnetic tape 14 becomes loose, for one reason or another, during the recording and reproducing mode, there is a reduced tension of the magnetic tape 14. As a result, the arm 47 moves clockwise responsive to a pivoting force applied thereto. Arm 47 moves in a pivotal motion in a clockwise direction and pushes the magnetic tape 14 toward the guide 36 as shown in FIG. 5B. The width $l_1$ of the magnetic tape 14 is wider than the width $L_3$ of the opening 71 of the guide 36 so that the magnetic tape 14 does not enter the opening 71. Accordingly, the folded end portion 47*a* of the arm 47 is intercepted by the magnetic tape 14. The tape cannot enter the recess 72, but is held at the position shown in FIG. 5B. The switch 49 is so constructed that it is opened and closed when the arm 47 makes a pivotal movement between the positions shown by the broken line. The full line in FIG. 5A and the switch 49 is not opened and closed when the arm 47 slightly moves in a pivotal movement from the position shown by the broken line in FIG. 5A to the position shown in FIG. 5B. Consequently, even if the magnetic tape 14 becomes slightly loose and is brought into the position shown in FIG. 5B, the switch 49 remains closed, and it is not erroneously opened. Hence, there is no possibility of a false operation of the switch 49 by loosening of the magnetic tape 14.

AUTOMATIC TAKE-UP REEL

Figure 9A:
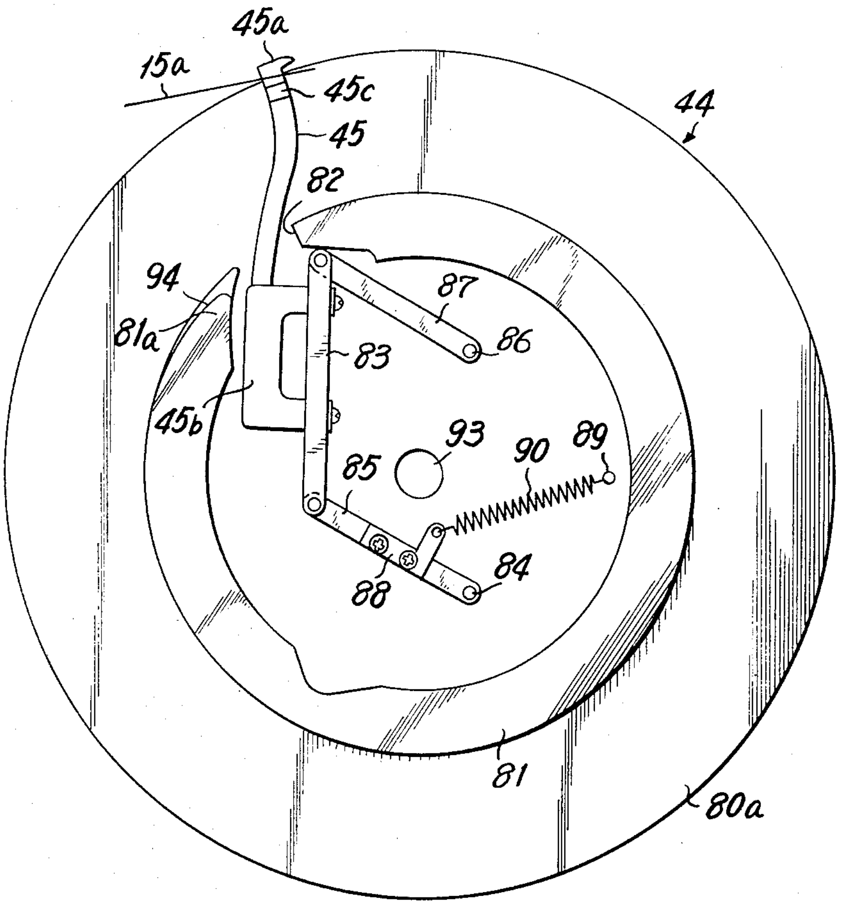
FIG. 9A and FIG. 9B are respectively plan views showing a state in which an automatic take-up reel starts to engage the leader and a state in which the reel has engaged the leader.
Figure 9B:
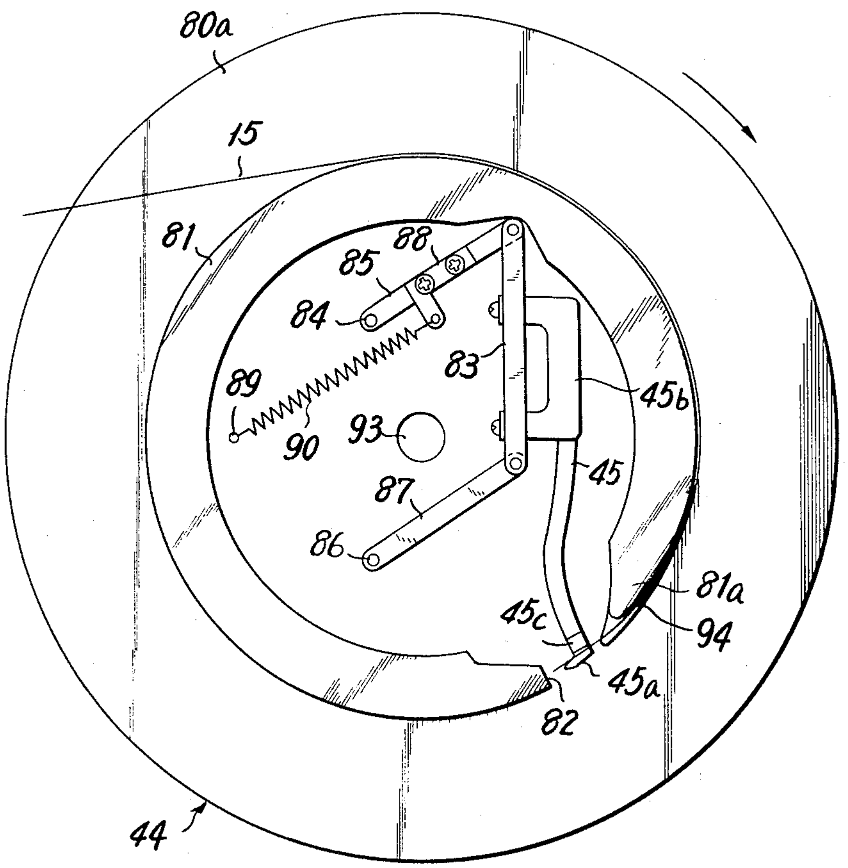

A plan view of the automatic take-up reel 44, with the upper reel flange removed, is shown in FIG. 9A and FIG. 9B. A reel hub 81 mounted fixedly on a lower reel flange 80*a*. An opening 82 is formed in the hub 81, from which the leader engaging pawl 45 is projected and retracted. At the foremost end of the engaging pawl 45, there is formed a hook-like pawl portion 45*a*. A base portion 45*b* of the engaging pawl 45 is fixed to a lever 83. The lever 83 is pivotally connected at one end with an end of a swingable arm 85 which is swingable about a shaft 84. At the other end of the lever 83 is a swingable arm 87, which is swingable about a shaft 86.

Figure 8:
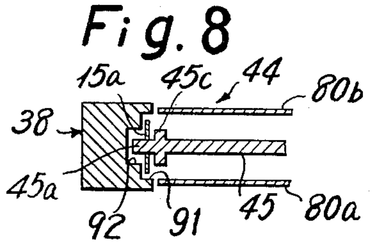
FIG. 8 is a vertical sectional view of a leader guide block for automatic winding shown in FIG. 1 and taken along the line VIII — VIII thereof.

A spring 90 is stretched between one end of an L-shaped lever 88 fixed to the arm 85 and a fixed pin 89 erected on the reel flange 80*a*. The swingable arm 85 is urged to turn clockwise by force of the spring 90. Accordingly, the swingable arm 85 is normally urged into position in which it has turned clockwise about the shaft 84, as shown in FIG. 9A. In this position, the engaging pawl 45 is extended outside of the reel hub 81 through the opening 82, the pawl portion 45*a* being projected outwardly of the outer peripheries of the lower and upper reel flanges 80*a* and 80*b* as shown in FIG. 9A and FIG. 8.

The guide block 38, having an arcuate form, is provided along the peripheral surface of the automatic take-up reel 44 and slightly spaced away from it. The vertical section of the guide block 38 is shown in FIG. 8. The guide block 38 is formed on the opposite side of the reel 44 with a recess 91 having a large width, which allows the leader 15 to move through the recess 91. Another recess 92 is formed in the middle of the recess 91. The recess 92 has a narrow width which only enables the pawl portion 45*a* to enter therein.

When the predetermined length of the tape leader 15 is fed out of the cartridge 10 and the first leader portion 15*a* entering the recess 91 in the guide block 38 stops at a predetermined position, the take-up reel starts its clockwise rotation with the pawl portion 45*a* projected outwardly of the reel flanges 80*a* and 80*b*. When the rotation of the reel 44 brings the pawl portion 45*a* into contact with the first leader portion 15*a* in the guide block 38, the pawl partion 45*a* is pushed slightly inwardly against the force of the spring 90. However, the engaging pawl 45 is urged to project outwardly by the spring 90. Thus, the pawl portion 45*a* engages the engaging slot 16 of the first leader portion 15*a* when the pawl portion 45*a* moves in a rotating motion to the position of the engaging slot 16, thereby engaging the first leader portion 15*a* at the foremost end of the engaging slot 16. Thereafter, the engaging pawl 45 rotates, and the first leader portion 15*a* is hooked by the pawl 45 whereby the first leader portion 15*a* leaves the guide block 38 and is pulled by the engaging pawl 45.

The end portion of the first leader portion 15*a*, caught by the pawl portion 45*a*, rests on a projection 45*c* provided in the vicinity of the pawl portion 45*a* of the engaging pawl 45. Therefore, the end portion of the first leader portion 15*a* is prevented from slipping down toward the base of the engaging pawl 45.

As the take-up reel 44 further rotates, the tension of the leader 15 causes the engaging pawl 45 to move slightly in a pivotal motion in a counterclockwise direction, as viewed from a reel shaft 93. The pawl moves against the force of the spring 90, thereby causing the engaging pawl 45 to be retracted into the reel hub 81. The direction of the moving of the engaging pawl 45, upon being retracted into the reel hub 81, and the direction of rotation of the take-up reel 44 are reverse to each other. The engaging and winding impact which is imparted to the first leader portion 15*a* is thus mitigated.

As the take-up reel 44 further rotates by nearly half a revolution, the engaging pawl 45 is completely retracted within the reel hub 81, as shown in FIG. 9B. Retraction occurs responsive to the tension of the leader 15 pulling against the force of the spring 90. During this time, the arms 85 and 87 swing about the shafts 84 and 86. The outer periphery of one end portion 81*a* of the reel hub 81, which forms the opening 82, is formed with a slope 94 extending toward the tip of the end portion 81*a*. This slope is gradually spaced away from a point which is inwardly displaced from the circle, which forms the outer periphery of the reel hub 81. As shown in FIG. 9B, the engaging pawl 45 is completely retracted within the reel hub 81. The top surface of the pawl portion 45*a* is positioned on or inside the same circumferential surface as the outer periphery of the reel hub 81. The part which follows the end portion of the first leader portion 15*a*, caught by the engaging pawl 45, is caused to move along the slope 94 of the reel hub end portion 81*a* and further along the outer periphery of the reel hub 81, continuously and smoothly. Consequently, after the engaging pawl 45 has engaged the first leader portion 15*a* and retracted within the reel hub 81, the foremost end portion of the first leader portion 15*a* is prevented from being bent abruptly. Instead, it is guided gradually along the slope 94 and the outer periphery of the reel hub 81. A permanent bend, due to the engagement, scarcely remains on the foremost end portion of the first leader portion 15*a*.

Generally, in order for a take-up reel to wind a tape in a stable condition without causing irregularity, the roll of tape wound on the reel hub is required to be a complete circle. In the type of apparatus shown in FIG. 1, the capstan 19 and the pinch roller 20 are located between the guide drum 26 and the tape cartridge 10, in the travelling path of the tape. The magnetic tape 14 which has passed through the guide drum 26 is positively wound by the tape-up reel 44. The irregularity in winding has an adverse effect on the magnetic tape which moves along the guide drum 26. Hence, the width of the opening 82 formed in the reel hub 81 should be as narrow as possible.

Accordingly, the projecting and retracting pawl 45 is curved as shown in FIG. 9A and FIG. 9B. It passes substantially the same curved position in the opening 82, notwithstanding a non-linear movement of the engaging pawl 45, due to the pivotal movement of the arms 85 and 87 about the shafts 84 and 86. The width of the opening 82 is slightly wider than the width of the engaging pawl 45.

In the foregoing embodiment, the passage of the first leader portion 15*a* in the guide block 38 consists of the recesses 91 and 92. The form of the passage, however, is not limited to this, but it may be of a C-shaped cross-section as in the guides 36 and 37.

TAPE CARTRIDGE

The construction of the tape cartridge 10 is now described.

Generally, while a tape cartridge containing a tape leader and a magnetic tape is not used, the tape leader is loosely wound due to its elasticity. Moreover, if the tape tends toward loosening, due to vibrations which take place during the transport thereof or other causes, creases will be produced on the joint between the leader and the tape. If the tape cartridge is inserted in the apparatus under this condition and the rotating tape feed roller 13 is brought into contact with the outer periphery of the roll of the leader and tape, the reel will not be rotated. The leader will not be fed out of the cartridge smoothly and accurately. Further, if there is any creases on the joint between the leader and the tape, quality of a reproduced picture will be extremely deteriorated.

Figure 10:
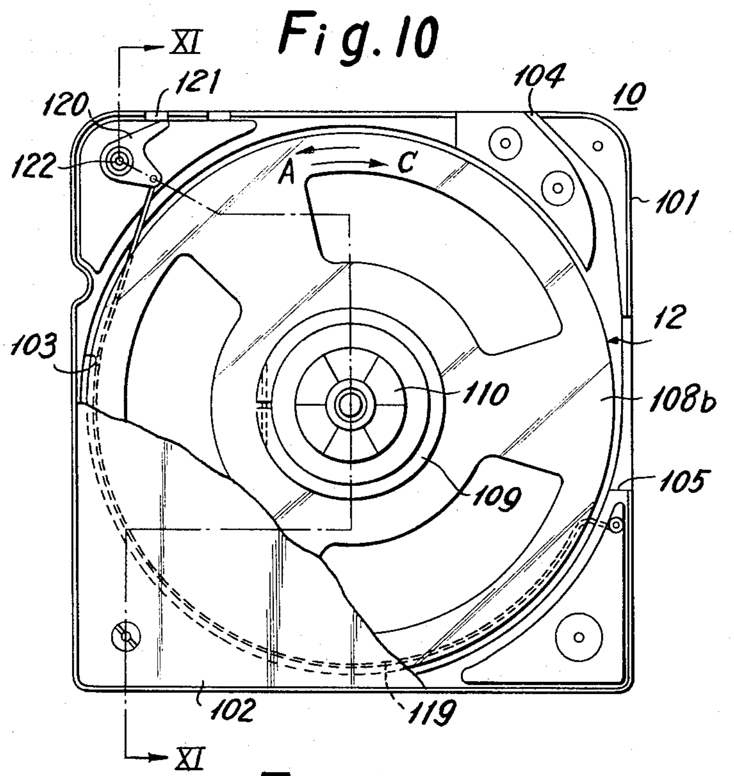
FIG. 10 is a bottom view of one embodiment of the tape cartridge with a part of the cover thereof being taken away.
Figures 11, 12A, 12B:
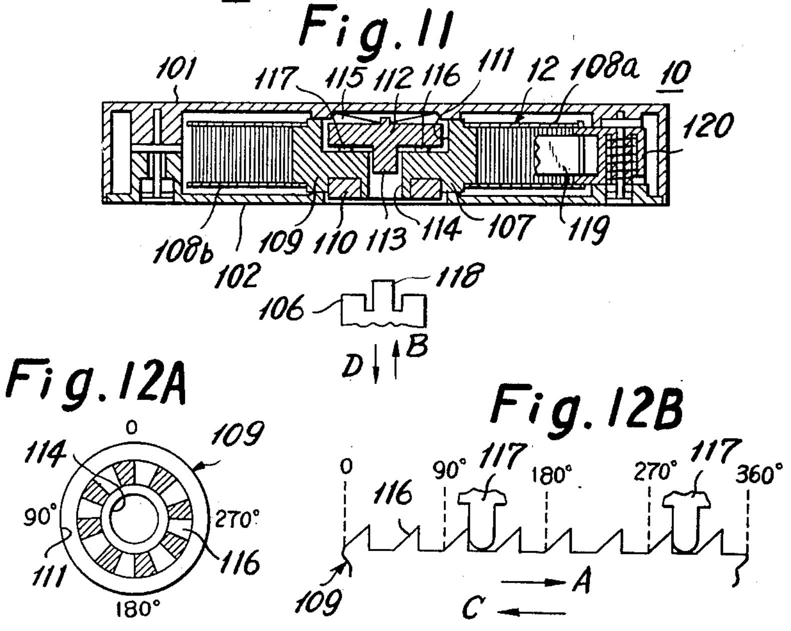
FIG. 11 is a vertical sectional view of the tape cartridge shown in FIG. 10 and taken along the line XI — XI.
FIGS. 12A and FIG. 12B are respectively a plan view and a explanatory development of a mechanism for stopping rotation of the reel.

The tape cartridge 10 used in the apparatus according to the invention has eliminated the above described disadvantages. In FIGS. 10 and 11, the tape cartridge 10 generally consists of a cartridge casing 101 having an upper cover and side plates intergrally formed therewith. A lower cover 102 covers the bottom of the casing 101 and the supply reel 12. The cartridge casing 101 is formed inside with a circular portion 103 which is slightly larger in diameter than the supply reel 12. In its front end, an outlet 104 enables a feeding out the leader 15 and the tape 14. In its side end, an opening 105 receives the tape feed roller 13. The lower cover 102 is formed at its center with an apertures 107 which receives a reel disc 106 of the apparatus.

The supply reel 12 consists of upper and lower reel flanges **108*a* and 108*b* and a reel hub 109. On the lower middle part of the reel hub 109, there is formed an annular projecting clutch portion 110 having a smaller diameter than the aperture 107. The reel hub 109 is formed in its upper middle part with a circular recess 111. An engaging member 112 is fitted in the circular recess 111, whereas a projecting portion 113 of the engaging member 112 is fitted in a central aperture 114 of the hub 109. The engaging member 112 is urged by a resilient force of a spring 115 positioned between the upper surface of the engaging member 112 and the lower surface of the upper cover of the casing 101. The spring acts in such direction that the lower surface of the engaging member 112 makes contact with the bottom of the circular recess 111 of the hub 109**.

On the bottom of the recess 111 of the hub 109 and opposite to the engaging member 112, there is provided an annular saw-tooth projection surface 116, as shown in FIG. 12A. The shadowed portions in FIG. 12A show the slopes of the projection surface 116, the development of which is shown in FIG. 12B. The engaging member 112 is provided on it lower surface with engaging projections 117. Since the engaging member 112 is always urged by the spring 115 as described above, the projections 117 are in engagement with the saw-tooth recesses of the projection surface 116. Thus, the reel 12, with the hub 109, is provented from rotating in the direction of arrow A. Accordingly, in a state in which the tape cartridge 10 is taken out of the apparatus, the reel 12 does not rotate unnecessarily in the casing 101. The engaging member 112 is engaged with the casing 101, either directly or through the spring 115 so as not to rotate with the reel 12.

The tape cartridge 10, having the above described construction, is inserted in the predetermined position shown in FIG. 1. The play button **18*a* is depressed to cause the reel disc 106 (FIG. 11) having a reel shaft 118 provided in the apparatus to project in the direction of arrow B. The reel shaft 118 enters the central aperture 114 of the reel hub 109 and the upper end of the reel shaft 118 pushes upwardly on the lower end of the projection 113 of the engaging member 112. The engaging member 112 moves upwardly against the force of the spring 115. As the engaging member 112 moves upwardly, its projections 117 are brought out of engagement with the saw-tooth projection surface 116 provided on the reel hub 109, thereby permitting the supply reel 12 to rotate. The supply reel 12 is rotated by the rotation of the reel disc 106 coupled with the clutch portion 110**.

A tape guide 119 is fixed at one end of the casing 101, and at the other end to a swingable lever 120. The swingable lever 120 is pivotally mounted on a shaft 122 and is normally urged to the pivoted position shown in the figure. The tape guide 119 is pulled by the swingable lever 120, which is disposed between the upper and lower flanges **108*a* and 108*b*. Guide 119** is in contact with the outer periphery of the roll of leader and tape to prevent the roll from becoming loose.

When the tape cartridge 10 is inserted into the predetermined position in the apparatus, a pin (not shown) provided in the apparatus enters the casing 101 through an opening 121 formed in the front end of the casing 101. The pin comes into contact with the lever 120 causing the lever 120 to move in a pivotal motion in a clockwise direction about the shaft 122. This causes the tape guide 119 to move away from the outer periphery of the roll of leader and tape, thus releasing the roll from the restriction by the tape guide 119.

REWINDING MODE

There is, as shown FIG. 2, a third leader portion **15*c* between the finishing or trailing end of the magnetic tape 14 and the reel hub of the supply reel 12. The third leader portion 15*c* has the same width as the magnetic tape 14. The third leader portion 15*c* is formed with slot portion 52 consisting of a slot 52*a* and a slot 52*b* similar to the slot portion 17. The slots 52*a* and 52*b* are positioned longitudinally on the same lines as the slots 17*a* and 17*b***.

As previously described in the descriptions about auto-threading and auto-loading, after the auto-threading and auto-loading operations are completed, recording or reproducing of the magnetic tape 14 is performed. When the recording or reproducing operation has been completed, tne third leader portion **15*c* reaches the position of the mechanical sensor 39**.

When the slot portion 52 of the third leader portion **15*c* reach the position of the sensor arm 40, the projections 60*a* and 60*b* engage the slots 52*a* and 52*b*. The sensor 39 changes to the ON state. By this, the fact that the magnetic tape 14 has completely been fed out of the supply reel 12 and recording or reproducing has been completed is detected. As the sensor 39 changes to the ON state, the apparatus is changed over to a rewinding mode. It is also possible to change the apparatus, so that it stops responsive to the change of the sensor 39** to the ON state.

During this rewinding mode, the pinch roller 20 (FIG. 1) is spaced away from the capstan 19 and the supply reel 12 is rotated positively in the rewinding direction, thereby rewinding the magnetic tape 14 and the leader 15. During this mode, the sensor arms 40 and 41 of the sensor 39 are retracted from the tape path through the sensor guide 21. This retraction prevents the arms 40 and 41 from engaging the slot portions 52 and 17.

The magnetic tape 14 and the tape leader 15 are rewound from the take-up reel 44, and the first leader portion 15*a* is disengaged from the pawl portion 45*a* of the engaging pawl 45. The arms 85 and 87 (FIG. 9a), the lever 83, and the engaging pawl 45 are brought into the state shown in FIG. 9A by the tension of the spring 90. The pawl portion 45*a* of the engaging pawl 45 projects outwardly of the reel 44.

All the magnetic tape 14 and then the tape leader are rewound from the take-up reel 44. The first leader portion 15*a* passes before the guide 22 (FIG. 1), and the tension arm 47 swings clockwise to open the microswitch 49. Since the arm 47 is pivotally supported on the oil damper 48, the arm 47 does not swing quickly, but swings slowly, when the folded end portion 47*a* (FIG. 5) is brought out of contact with the first leader portion 15*a*. As a result, the switch 49 does not immediately open, but does open with some time lag after the first leader portion 15*a* has passed. This time lag is so selected that it is at least a period of time measured from the passage of the first leader portion 15*a* away from the position of the arm 47 to the completion of rewinding thereof in the tape cartridge 10. Consequently. when the switch 49 is opened, the leader 15 has completely left the tape path in the apparatus.

After rewinding all the magnetic tape 14 and the tape leader 15 into the tape cartridge 10 by the foregoing rewinding operation, the stop button 18*c* is depressed to place the apparatus in a stop mode.

For removing the tape cartridge 10 from the apparatus, a reject button 18*c* is depressed. This causes the reel shaft 118 (FIG. 11) together with the reel disc 106 to move downwardly in the direction of arrow D, allowing the engaging member 112 to move downwardly by force of the spring 115. The projections 117 of the engaging member 112 are again engaged with the recesses of the saw-tooth projection surface 116 of the hub 109 to lock the hub 109. Accordingly, the rotation of the supply reel 12 in the direction of arrow A is prevented.

If the reel 12 is urged to be rotated in the direction of arrow C, while projection 117 and teeth 116 are in this engaged state, the projections 117 move upwardly along the slopes of the projection surface 116 and against the force of the spring 115, thus permitting the reel 12 to rotate. Accordingly, if the rotation of the reel 12 in the direction of arrow A is made a direction to unwind the tape and if the rotation in the direction of arrow C is made a direction to wind the tape, the reel 12 does not rotate in an unwinding direction in the cartridge 10, resulting in a loosening of the winding of the roll of the tape 14, even when the cartridge 10 is taken out of the apparatus.

The invention is not limited to the above described embodiments but various changes and modifications can be made without departing from the spirit and scope of the invention.

We claim:

1. An automatic tape loading type magnetic recording and reproducing apparatus comprising a supply reel having a roll of tape-like member wound thereon, feeding means for feeding said tape-like member from said supply reel, guiding means for guiding said tape-like member along a predetermined path of travel in the apparatus, means comprising an automatic tape-up reel for automatically engaging and winding said tape-like member in said guiding means, first detecting means for detecting when a predetermined length of said tape-like member has been fed to a position where said tape-like member is engaged by said automatic take-up reel, means for substantially stopping said feeding means responsive to the operation of said first detecting means, means for positively rotating said automatic take-up reel responsive to the operation of said detecting means, so as to positively wind the tape-like member on aaid automatic take-up reel, second detecting means for detecting when said automatic take-up reel is positively winding up said tape-like member, driving means including a capstan and a pinch roller for positively driving the tape-like member, and means for operating said driving means responsive to the operation of said second detecting means, thereby to positively drive said tape-like member.

2. The apparatus as defined in claim 1 wherein said automatic take-up reel includes an engaging pawl, means in the reel hub for projecting and retracting said pawl, said engaging pawl being normally urged to a pawl portion wherein the forward end of said engaging pawl projects outwardly from the outer periphery of the reel flanges, and said pawl portion has a configuration that catches a leading end portion of said tape-like member when it has been fed out by the predetermined length, said pawl catching said tape responsive to the rotation of said automatic take-up reel when said pawl is positioned outside of said reel flanges.

3. The apparatus as defined in claim 2 further comprising means including a tape leader guiding member provided along and slightly spaced away from the outer periphery of said automatic take-up reel, said guiding member being positioned to receive the leading end of the predetermined length of tape-like member as it is fed through the predetermined path of travel in the apparatus, and said guiding member retaining said leading end of the tape-like member to a predetermined position, said pawl portion engaging said tape-like member within said tape-like member guiding member.

4. The apparatus as defined in claim 1 wherein said automatic take-up reel comprises upper and lower reel flanges, a reel hub having an opening, an engaging pawl having at its forward end a pawl portion for engaging the tape-like member, means in said opening of the reel hub for projecting and retracting said pawl, a swingable arm member in said reel hub for swingably supporting the base of said engaging pawl, and a spring member for normally applying a force to urge said engaging pawl project outwardly from the outer periphery of said reel flanges, said swingable arm member being so constructed that it moves in a pivotal motion to cause said engaging pawl to be projected from and retracted in said reel hub.

5. The apparatus as defined in claim 1 wherein a predetermined portion of said tape-like member is formed with a slot portion, said first detecting means comprising of a first sensor member for engaging a slot of the slot portion thereby mechanically detecting said predetermined position, means comprising a second sensor member for mechanically detecting a contact thereof with said tape-like member, normally closed first switch means which cooperates with said first sensor member, and normally opened second switch means which cooperates with said second sensor member, said first and second switches being closed for detecting when the predetermined length of tape-like member has been fed out, said detecting means indicating when said first sensor member engages said slot of the tape-like member and said second sensor member simultaneously makes contact with said tape-like member.

6. The apparatus as defined in claim 1 wherein said tape-like member comprises a tape and a tape leader connected to the leading end of said tape, said tape leader having a wide leader portion of a predetermined width and a narrow leader portion following the wide leader portion, and said second detecting means comprising a guide member having a passage through which said wide leader portion moves and an opening from which said narrow leader portion can be disengaged and which is formed with a recess, a tension arm dimensioned to enter said recess of the guide member, said tension arm being pushed by said narrow leader portion as it is disengaged from said opening, and switch means which cooperates with said arm to open and close a circuit, said tape following said tape leader having a width which is wider than the width of the opening of said guide member.

7. The apparatus as defined in claim 1 wherein said tape-like member comprises a tape and a tape leader connected to the leading end of said tape, said magnetic recording and reproducing apparatus having a magnetic head assembly means for recording on and reproducing from the tape, said first detecting means being disposed between said supply reel and said magnetic head assembly, and said second detecting means being disposed between said automatic take-up reel and said magnetic head assembly.

8. The apparatus as defined in claim 7 wherein said tape-like member driving means is disposed between said supply reel and said magnetic head assembly.

9. An automatic tape feeding system for a magnetic tape recorder comprising means for feeding out a predetermined length of said magnetic tape, said magnetic tape having a leader on opposite ends thereof, each of said leaders having coded slots therein, means for substantially stopping said feeding means after said predetermined length is fed out, means comprising a take-up reel for catching the fed out end of said tape and thereafter winding said tape on said reel, detector means for mechanically detecting said slots to detect said tape position, and means responsive to said detector means for selectively controlling said tape recorder.

* * * * *